United States Patent
Adileh et al.

(10) Patent No.: US 7,632,432 B2
(45) Date of Patent: Dec. 15, 2009

(54) PROCESS FOR FORMING A COATED LAYER ON A TORIC SURFACE OF AN OPTICAL ARTICLE

(75) Inventors: Fadi Adileh, St. Petersburg, FL (US); Peiqi Jiang, St. Petersburg, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 181 days.

(21) Appl. No.: 11/570,012

(22) PCT Filed: Jun. 2, 2005

(86) PCT No.: PCT/EP2005/005986

§ 371 (c)(1),
(2), (4) Date: Dec. 4, 2006

(87) PCT Pub. No.: WO2005/118268

PCT Pub. Date: Dec. 15, 2005

(65) Prior Publication Data

US 2008/0036104 A1 Feb. 14, 2008

Related U.S. Application Data

(63) Continuation-in-part of application No. 10/861,580, filed on Jun. 4, 2004, now abandoned.

(51) Int. Cl.
*B29D 11/00* (2006.01)

(52) U.S. Cl. .................... 264/1.7; 264/2.5; 427/162

(58) Field of Classification Search .............. 264/1.7, 264/2.3, 2.5, 1.32, 132; 156/273.7, 285, 156/295; 427/162; 425/808
See application file for complete search history.

(56) References Cited

U.S. PATENT DOCUMENTS

| 4,680,998 | A * | 7/1987 | Council, Jr. ............... 82/1.11 |
| 6,562,466 | B2 | 5/2003 | Jiang et al. ............... 428/412 |
| 2003/0017340 | A1 | 1/2003 | Jiang et al. ............... 428/412 |
| 2005/0140033 | A1 * | 6/2005 | Jiang et al. ............... 264/1.7 |

OTHER PUBLICATIONS

U.S. Appl. No. 10/417,525, filed Apr. 17, 2003, Weber.
Office Action issued in U.S. Appl. No. 10/861,580, mailed Mar. 11, 2008.

* cited by examiner

*Primary Examiner*—Mathieu D. Vargot
(74) *Attorney, Agent, or Firm*—Fulbright & Jaworski L.L.P.

(57) ABSTRACT

The invention concerns a process for forming at least one coating layer on a toric surface of an optical article which comprises: providing an optical article 1 having a toric surface comprising a first principal meridian with a lower radius of curvature r and a second principal meridian with a higher radius of curvature R (r<R) and a periphery 2; depositing on the toric surface at least two drops 2a, 2b of the liquid curable composition, each within one of two opposite sectors S1, S2 centered on the first principal meridian of lower radius of curvature r and having an apex angle up to 40°; applying pressure on said pre-measured amount of liquid curable composition to cause said liquid curable composition to spread over the toric surface of the optical article; curing the liquid curable composition; and recovering an optical article coated with at least one coating layer.

22 Claims, 10 Drawing Sheets

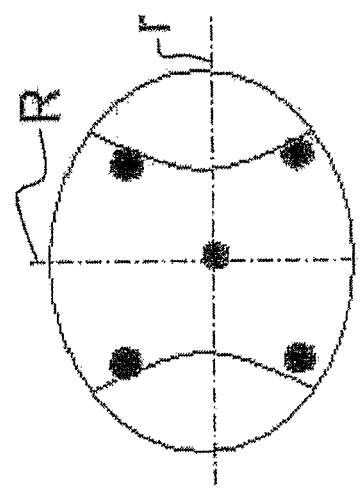
FIGURE 5A
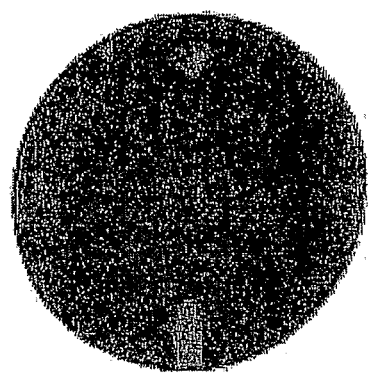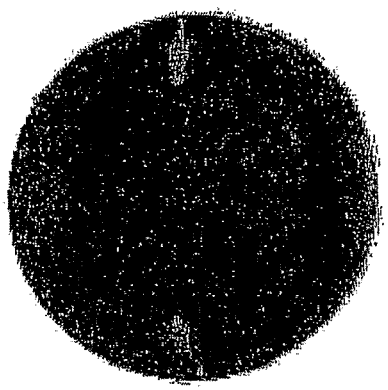
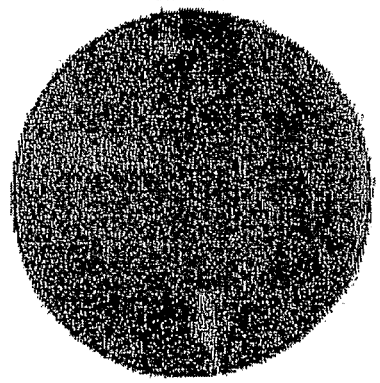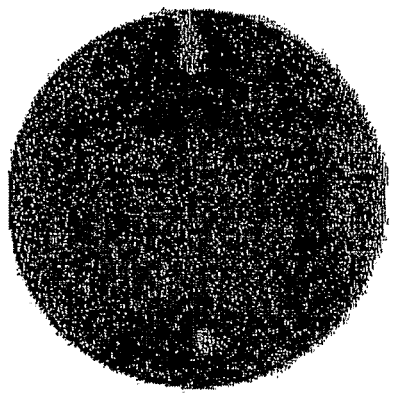
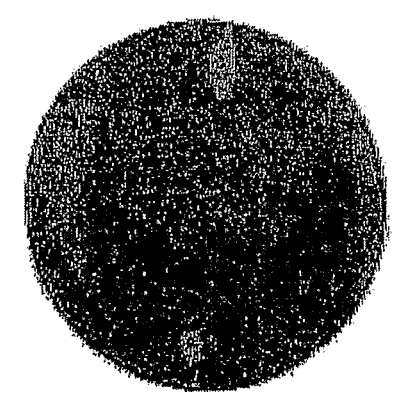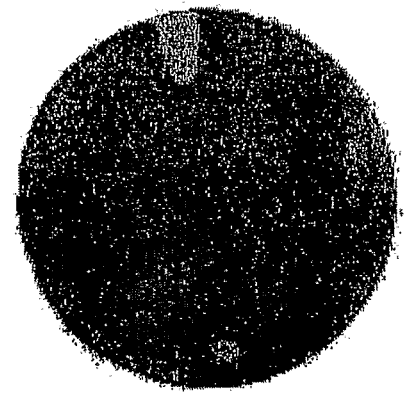
0.12 g
0.15 g
FIGURE 5B
FIGURE 5C 0.15 g 0.12 g

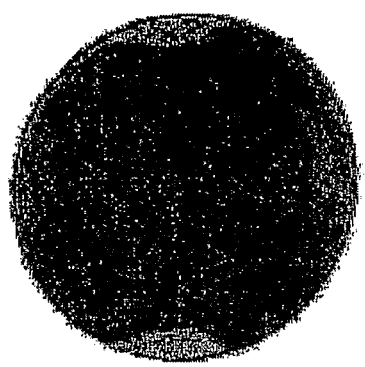 0.12 g
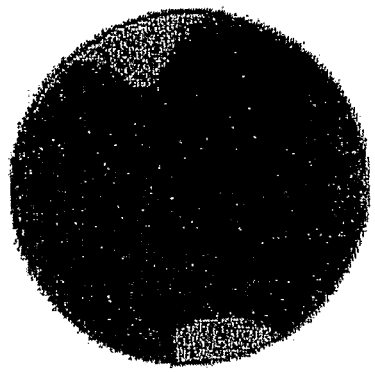 0.15 g
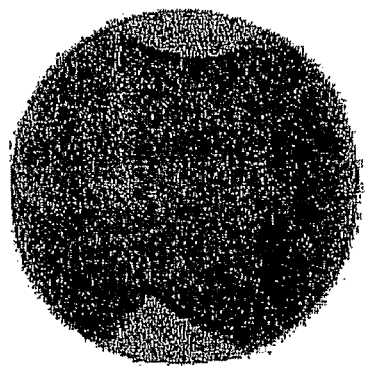
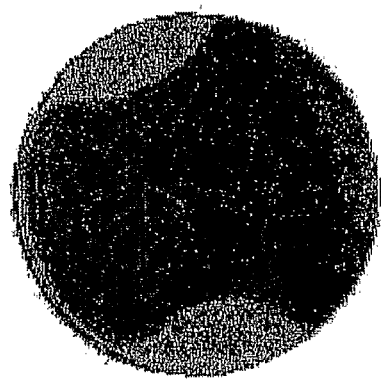
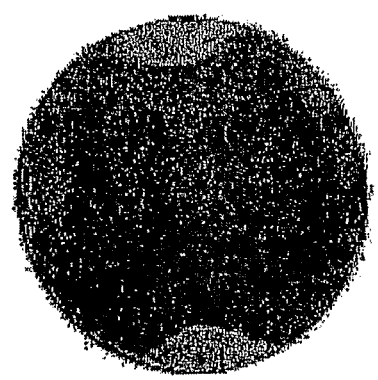
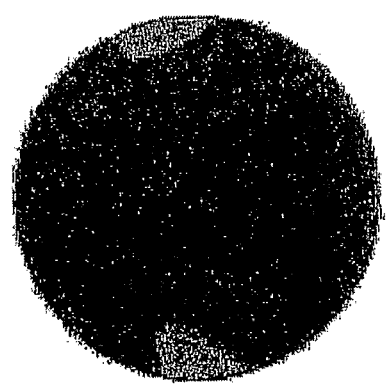
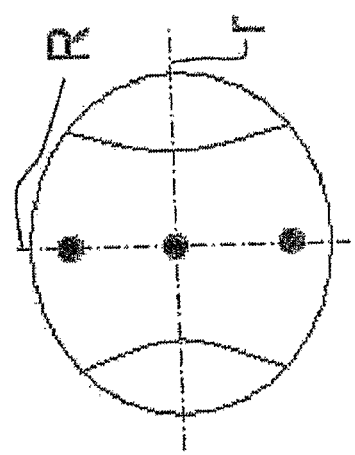
FIGURE 7A
FIGURE 7B
FIGURE 7C

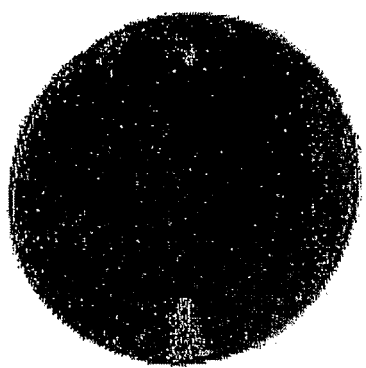
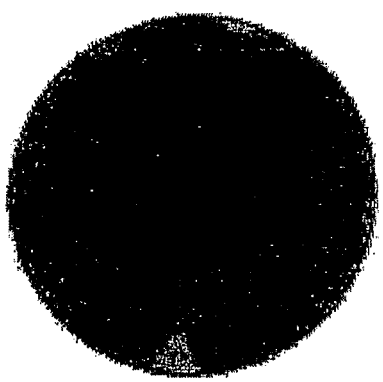
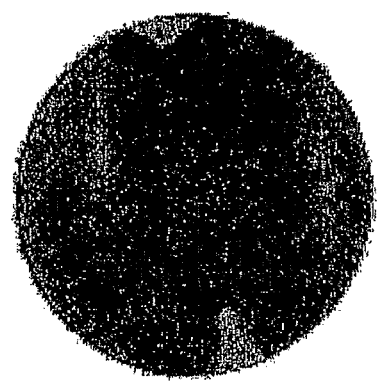
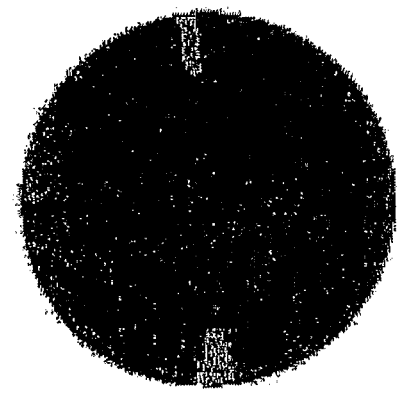
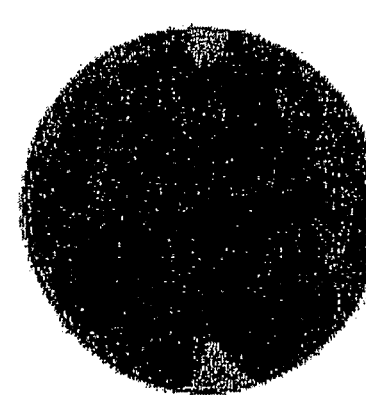
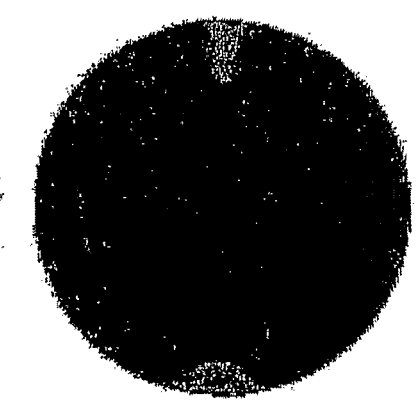
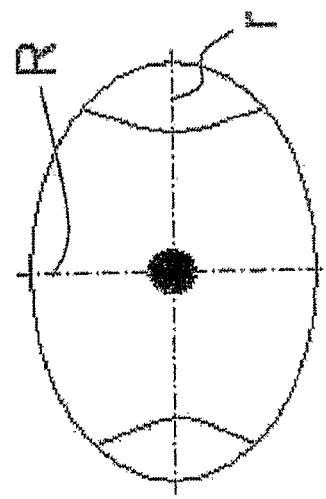
FIGURE 10A
FIGURE 10B
FIGURE 10C 1-Line Stream

PROCESS FOR FORMING A COATED LAYER ON A TORIC SURFACE OF AN OPTICAL ARTICLE

This application is a national phase application under 35 U.S.C. 517 371 of International Application No. PCT/EP2005/005986 filed 2 Jun. 2005, which claims priority to U.S. application Ser. No. 10/861,580 filed 4 Jun. 2004. The entire text of each of the above-referenced disclosures is specifically incorporated herein by reference without disclaimer.

The present invention relates to a process for making a coating layer of a curable composition on a toric surface of an optical article, in particular an ophthalmic lens or lens blank, and in particular a functional coating layer.

In one embodiment of the invention, the coating layer is a curable adhesive coating composition whereby a further coating layer or stack of coating layers is transferred from a support on the toric surface of the optical article.

It is a common practice in the art to coat at least one face of an ophthalmic lens or lens blank with several functional coatings for imparting to the lens or lens blank additional or improved properties. Thus, it is usual practice to coat at least one surface of an ophthalmic lens or lens blank, typically made of an organic glass material, with successively, starting from the surface of the lens or lens blank, an impact resistant and/or adhesive primer coating, an abrasion and/or scratch resistant coating (commonly designated as "hard coat"), an anti-reflecting coating, and, optionally, hydrophobic final top coat, as well as other coatings such as polarized coating and photochromic or dying coating.

Numerous processes and methods have been proposed for coating a surface of an ophthalmic lens or lens blank. U.S. Pat. No. 6,562,466 discloses a process for transferring a coating on a main face of a lens blank which comprises depositing a requisite amount of a curable glue on a main face of a lens blank, bringing a coating borne by a flexible support in contact with the curable glue, applying a pressure to the flexible support to spread the glue and form an uniform layer of glue on the main face of the lens blank, curing the glue and withdrawing the support, whereby one recovers a lens blank having the coating adhered to the main face of the lens blank.

U.S. patent application Ser. No. 10/417,525 discloses a process similar to the above described process.

These processes will be referred as "coating transfer processes" or "back side treatment (BST)" as the coating transfer is usually effected on the backside of the lens.

U.S. patent application Ser. No. 10/750,145 discloses a process for making a coated optical article free of visible fining lines which comprises:
(i) providing an optical article having at last one fined but unpolished geometrically defined main face;
(ii) providing a mold part having an internal and an external surface;
(iii) depositing on said main face of said optical article or on the internal surface of a mold a requisite amount of a liquid curable coating composition
(iv) moving relatively to each other the optical article and the mold part to either bring the coating composition into contact with the main face of the optical article or into contact with the internal surface of the mold part;
(v) applying pressure to the mold part to spread the liquid curable coating composition on the said main face and form a uniform layer of the liquid coating composition onto the main face;
(vi) curing the liquid coating composition layer;
(vii) withdrawing the mold part; and
(viii) recovering a free of visible fining lines coated optical article.

Preferably, the pressure is maintained during the curing step.

This later process will be referred as "press coating process".

By a requisite or premeasured amount of liquid curable coating composition or glue, one means a sufficient amount for forming a final coating covering the entire surface area of the surface to be coated or to obtain transfer and adhesion of the coating.

In both the press coating process and the coating transfer processes an important requirement is that, in the course of the pressure application step, the curable composition be regularly spread on the entire surface area of the optical article so that, after curing, there is formed a coating layer or an adhesion interlayer, preferably of uniform thickness, covering the entire surface area of the optical article.

Concomitantly, the amount of curable composition shall be kept as low as possible to prevent large overflowing of the curable composition at the periphery of the optical article for avoiding an additional cleaning step to eliminate the composition from the periphery of the article.

In the above press coating and transfer coating processes, it has been proposed to deposit the curable composition in the form of one drop at the center of the surface of the optical article or of patterns of four (4) drops at the corners of a square centered on the surface or of five (5) drops, one at the center and four at the corners of a centered square.

Applicant has found that, when the surface of the optical article to be coated is a toric surface, depositing only one drop of the curable composition or patterns of four or five drops as above randomly on the surface of the optical article, the curable composition does not spread regularly over the entire surface area of the optical article, thus, leaving uncovered areas in the final optical article, unless large amounts of curable composition are used resulting likely in an overflowing of the curable composition at the periphery of the optical article.

SUMMARY OF THE INVENTION

It is an object of the invention to provide a process for forming at least one coating layer in which a requisite amount of liquid curable composition is deposited on a toric surface of an optical article, in particular an ophthalmic lens or lens blank, and is spread under pressure over the entire toric surface of the optical article, whereby, after curing, the curable coating composition forms a cured coating layer, preferably of uniform thickness, covering the entire surface area of the surface of the optical article;

It is a further object of the invention to provide a process as above in which the amount of curable composition used avoids overflowing of the curable composition at the periphery of the optical article;

It is still an object of the invention to provide a process as above which is a press coating process;

It is still another object of the invention to provide a process as above which is a transfer coating process.

In accordance with the above objects and those that will be mentioned and will become apparent below, the process for forming at least one coating layer on a toric surface of an optical article according to the invention comprises:
providing an optical article having a toric surface comprising a first principal meridian with a lower radius of curvature r and a second principal meridian with a higher radius of curvature R (r<R) and a periphery;

depositing on said toric surface of the optical article a pre-measured amount of a liquid curable composition;

applying pressure on said pre-measured amount of liquid curable composition to cause said liquid curable composition to spread over the toric surface of the optical article;

curing the liquid curable composition ; and recovering an optical article coated with at least one coating layer.

wherein, the liquid curable composition deposition step comprises depositing on the toric surface at least two drops of the liquid curable composition, each within one of two opposite sectors centered on the first principal meridian of lower radius of curvature r and having an apex angle up to 40°, preferably up to 30°.

Preferably the two drops are deposited on the first meridian of lower radius of curvature itself.

In a preferred embodiment, the two drops are also deposited at a distance from the periphery of the optical article ranging from 2 to 20 mm, preferably from 5 to 10 mm (distance from the edge of the drop to the periphery of the optical article).

Additional drops of the liquid curable composition may also be used, in particular for forming patterns of 3, 4 and 5 drops.

In the 3 drops pattern the additional drop is preferably deposited at the center of the toric surface.

In the 4 drops pattern the two additional drops are preferably deposited each in one of two sectors as defined above but centered on the second principal meridian of higher radius of curvature R, and more preferably on the second principal meridian. Preferably also, the two additional drops are deposited at a distance from the periphery of the optical article ranging from 2 to 20 mm, preferably from 5 to 10 mm.

In the 5 drops pattern, preferably two of the additional drops are deposited as the additional drops of the 4 drops pattern and the third additional drop is deposited at the center of the optical article. This 5 drops pattern is the most preferred pattern for the process of the invention.

Deposition of a drop in a sector means that at least 50%, preferably at least 60%, more preferably at least 70% and even better 100%, of the surface of contact of the drop with the toric surface is situated inside the corresponding sector.

Also, except for the additional drop deposited at the center of the toric surface, the minimal distance between the center of the toric surface and the edge of each drop is preferably 10 to 20 mm and better from 15 to 25 mm.

The drops of the curable composition can also be linked through thin lines of the curable composition.

By thin lines there is meant lines of width at most equal to the size of the drops (the diameter in case of circular drops).

Compared to the case wherein the liquid curable composition is deposited in a drop pattern, depositing the liquid curable composition as a thin line avoids a stop and go dispense of the liquid curable composition which may create bubbles and alter the cosmetics of the lens.

One or more thin lines can be deposited.

Preferably, the thin lines are straight lines extending from one high toric side to another high toric side of lens surface.

In a further embodiment of the invention, the liquid curable composition is deposited in the form of at least one thin line along the first principal meridian of lower radius of curvature.

In fact, the thin line deposition pattern can be defined as dispensing the drops in one continuous stream line.

As indicated above, the amount of curable composition is to be kept low to avoid overflowing during the coating process, but sufficient to obtain the coverage of the entire surface area of the toric surface.

Typically, the total amount of curable composition is 0.25 g or less, preferably 0.20 g or 0.12 g.

Usually, the drops are of circular shape and the ratio d/D of the diameter d of the drops of curable composition to the diameter D of the optical article ranges from 0.005 to 0.3, and typically is of 0.01 to 0.15. Of course, this ratio is depending upon the number of deposited drops and the viscosity of the liquid curable composition, keeping in mind that the total amount of curable composition shall be kept low, preferably being 0.25 g or less, and better 0.20 g or less.

The liquid curable coating composition can be any classical liquid curable composition typically used for forming functional coating layers for improving the optical and/or mechanical properties of an optical article, in particular an ophthalmic lens or lens blank, for example a primer coating for improving adhesion and/or impact resistant, an abrasion and/or scratch resistant coating (commonly designated as hard coat), a hydrophobic top coat, as well as other coatings such as a polarized coating and a photochromic or dying coating.

In particular, the liquid curable composition can be a liquid curable adhesive composition for use in a transfer coating process.

Preferred impact resistant and primer coating compositions are polyurethane latex or acrylic latex compositions.

Preferred anti-abrasion hard coating compositions comprise a hydrolyzate of one or more epoxysilane(s) and one or more inorganic filler(s) such as colloidal silica.

The curable liquid coating compositions can be thermally cured or cured through light irradiation, in particular UV irradiation or both. Preferably, the curable liquid coating compositions are UV curable coating compositions and in particular UV curable anti-abrasion hard coating compositions.

The toric surface of the optical article can be a naked surface, i.e. a surface free of any deposited coating layer or it can be a toric surface already covered with one or more functional coating layers, in particular a primer coating layer.

The toric surface of the optical article, in particular an ophthalmic lens or lens blank, is preferably the backside surface of the article, i.e. the surface of the article which in use, is the closest to the user's eye.

The pressure application step of the process of the present invention can be conveniently implemented using a rigid mold part whose internal surface, i.e. the surface of the mold part intended to come into contact with the liquid curable composition, inversely replicates the geometry of the toric surface to be coated or a flexible mold part whose internal surface inversely replicates the geometry of the toric surface under the pressure applied.

Obviously, the pressure is applied on the external surface of the mold part.

The pressurizing flexible mold part can be a flexible wafer, preferably having higher base curvature than the curvature of the toric surface to be coated, in particular a back side toric surface. The flexible wafer can be made of any appropriate material, preferably of a flexible plastic material, especially a thermoplastic material and in particular of polycarbonate.

The working surface of the flexible wafer i.e. the surface of the wafer in contact with the curable liquid coating composition may have a relief organized according to a pattern, in other words, may be microstructured and may confer to the final lens an optical surface having the properties imparted by the microstructure (for example antireflective properties).

Different techniques for obtaining a microstructured mold part are disclosed in WO99/29494.

When using a flexible wafer, it is only necessary to provide the wafer with a surface the geometry of which conforms to the general shape of the toric surface of the optical article onto which the coating is to be applied, either a concave or convex shape, but it is not necessary that this surface strictly corresponds to the geometry of the optical article surface to be coated. Thus, the same flexible wafer can be used for applying coatings onto optical article having toric surfaces of different specific geometries. Generally, the flexible wafer has two parallel main surfaces and consequently has an even thickness. Preferably, the flexible wafer is spherical.

Flexible wafers typically have a thickness of 0.2 to 5 mm, preferably of 0.3 to 5 mm. More preferably, the flexible wafer is made of polycarbonate, and in this case the thickness is preferably from 0.5 to 1 mm.

Preferably, the flexible wafers are light transparent, in particular to the UV light, thus permitting UV curing of the coating composition.

According to the invention, a pressure is exerted on the external surface of the wafer (i.e. the surface of the wafer which is not in contact with the coating composition) and is preferably substantially maintained at least up to the gelling of the composition. Applying and maintaining the pressure can be effected through the use of an inflatable membrane placed on the external surface of the wafer.

The applied pressure usually ranges from 10 to 350 kPa (3.5 kgf/cm$^2$), and preferably from 30 to 150 kPa, even better 30 to 100 kPa.

As previously mentioned, pressurization of the flexible wafer may be effected using an inflatable membrane.

The inflatable membrane can be made of any elastomeric material which can be sufficiently deformed by pressurization with appropriate fluid for urging the flexible wafer against the lens or lens blank in conformity with the surface geometry of the lens or the lens blank.

Typically, the inflatable membrane has a thickness ranging from 0.50 mm to 5.0 mm and an elongation of 100 to 800%, and a durometer 10 to 100 Shore A.

If the coating composition is thermally cured, then the material of the inflatable membrane shall be selected to bear the curing temperature.

If the coating composition is UV cured, then a transparent material shall be selected, for example a transparent silicone rubber or other transparent rubbers or latexes: the UV light is preferably irradiated from the mold part side.

The pressure applied to the mold part by the inflatable membrane typically ranges from 10 kPa to 150 kPa and will depend on the lens or lens blank and flexible wafer sizes and curvatures. Of course, the pressure needs to be maintained onto the flexible wafer and the lens or lens blank until the coating composition is sufficiently cured so that enough adhesion of the coating to the lens or lens blank is obtained.

The flexible mold part of the process of the invention may be the inflatable membrane itself described above, in particular an inflatable membrane of an air accumulator apparatus. In that case, of course, no flexible wafer is used.

Similar pressures as with a flexible wafer are used with the inflatable membrane.

Either the wafer or the inflatable membrane can be precoated, for example with a release coating, to exhibit good optical surface for keeping optical grade of the coated lens blank.

As for the flexible wafer, the inflatable membrane may comprise in its surface contacting the coating composition a micro-structure or pattern that will be duplicated in the coating during the coating process.

The mold part may be obtained by using known processes such as surfacing, thermoforming, vacuum thermoforming, thermoforming/compression, injection molding and injection/compression molding.

As previously indicated, a toric surface has two principal meridians, of radii R and r with R>r, and it is possible to calculate two base curvatures BLR and BLr corresponding respectively to radii R and r defining the toric surface.

The base curvature (or base) is defined as the ratio 530/radius of curvature (in mm). Thus, $$BLR = \frac{530}{R} \text{ and } BLr = \frac{530}{r},$$

with R and r in mm.

Preferably, the flexible mold part is spherical and has a base curvature BC.

Base curvatures of the toric surface BLR and BLr and the base curvature of the flexible mold BC part preferably shall satisfy the following relationship:

BLR<BLr a) if BLr−BLR≦3.5
  0<BC−BLR<3}
  |BC−BLr|<1}
preferably
  0.2<BC−BLR<2.5}
  |BC−BLr|<0.5}
b) if BLr−BLR>3.5
  BLR<BC<BLr The internal surface of the mold part may be precoated with a coating layer or a stack of coating layers in order to be transferred on the toric surface during the implementation of the process of the invention. Of course, when a stack of layers is formed on the internal surface of the mold part they are placed in the reverse order to that they shall be stacked on the toric surface.

The transferred coating layer or stack of the coating layers may comprise any coating layer or stack of coating layers classically used in the optical field, such as an anti-reflective coating layer, an anti-abrasion coating layer, an impact resistant coating layer, a hydrophobic top coat, a polarized coating layer, a photochromic coating layer, an optical-electronical coating, an electric-photochromic coating, a dying coating layer, a printed layer such as a logo or a stack of two or more of these coating layers.

Preferably, the transferred stack of coating layers comprises:

optionally, a hydrophobic top coat;
an antireflective stack, generally comprising inorganic material such as metal oxide or silica;
a hard coat, preferably comprising a hydrolyzate of one or more epoxysilane(s) and one or more inorganic filler(s) such as colloidal silica;
optionally, an impact strength primer, preferably a polyurethane latex or an acrylic latex; each of the layers of the stack being deposited onto the internal surface of the mold part in the above recited order.

The method of the invention is particularly interesting for transferring the whole stack comprising "top coat, antireflective coat, hard coat and primer coat".

Generally the thickness of the antireflective coat ranges from 80 nm to 800 nm and preferably 100 nm to 500 nm.

The thickness of the hard coat preferably ranges from 1 to 10 micrometers, preferably from 2 to 6 micrometers.

The thickness of the primer coat preferably ranges from 0.5 to 3 micrometers.

Typically, the total thickness of the coating layer or stack of coating layers to be transferred is 1 to 500 µm, but is preferably less than 50 µm, more preferably less than 20 micrometers, or even better 10 µm or less.

When, the process of the present invention is used for transferring coating layers on the toric surface of the optical article, the liquid curable composition is a curable adhesive composition or glue which after curing forms an adhesive interlayer between the transferred coating layers and the toric surface of the optical article.

In a further embodiment of the invention, a transparent film can be placed between the internal face of the mold part and the toric surface of the optical article having the pre-measured amount of liquid curable composition deposited thereon, whereby, after completion of the process, the transparent film is glued on the toric surface of the article.

The film is made of any suitable transparent material, and preferably of a transparent plastic material such as poly(meth)acrylate, polycarbonate, polyurethane, polythiourethane, polyepisulfide polymers and copolymers and blends thereof.

Typically, the transparent film will preferably have a thickness of 1 mm or less, more preferably of 500 µm or less, even better of 100 µm or less.

The external face of the transparent film, i.e. the face of the film which will not come into contact with the curable composition, may be previously provided with one or more of the functional coating layers, as defined above, whereby one or more functional coatings are also applied to the optical article after completion of the process.

The glue or adhesive may be any curable glue or adhesive, preferentially a thermally curable or photocurable, in particular UV curable, glue or adhesive that will promote adhesion of the coating to the optical surface of the optical article without impairing the optical properties of the finished optical article.

Some additives such as photochromic dyes and/or pigments may be included in the glue.

The curable glue or adhesive can be polyurethane compounds, epoxy compounds, (meth)acrylate compounds such as polyethyleneglycol di(meth)acrylate, ethoxylated bisphenol A di(meth)acrylates.

The preferred compounds for the curable glue or adhesive are acrylate compounds such as polyethyleneglycoldiacrylates, ethoxylated bisphenol A diacrylates, various trifunctional acrylates such as (ethoxylated) trimethylolpropane triacrylate and tris(2-hydroxyethyl)isocyanurate.

Monofunctional acrylates such as isobornylacrylate, benzylacrylate, phenylthioethylacrylate are also suitable.

The above compounds can be used alone or in combination.

Preferably, when cured, the glue layer has an even thickness. Suitable glues are commercially available from the Loctite Company.

The thickness of the final glue layer after curing is preferably less than 100 µm, preferably less than 80 µm, most preferably less than 50 µm and usually 1 to 30 µm.

The optical article may be made of any material suitable for making optical lenses but is preferably made of a plastic material and in particular of diethyleneglycol bis-allylcarbonate copolymer (CR-39® from PPG INDUSTRIES), poly(meth)acrylate, polycarbonate (PC), polyurethane, polythiourethane, and polyepisulfide, polymer and copolymers including blends thereof, optionally containing photochromic compounds. Also, the optical article material may be tinted.

The toric surface of the optical article to be coated using the process of the invention may be a surface that has been fined but unpolished. Typically, such a fined but unpolished surface will have a $R_q$ of 0.05 to 1.5 µm, preferably of 0.1 to 1.0 µm. When the optical article is made of diethylene glycol bis-allyl carbonate polymer, the surface roughness $R_q$ of the fined but unpolished surface is generally about 1.0 µm, whereas when the optical article is made of polycarbonate, the surface roughness of the fined but unpolished surface is generally about 0.5 µm.

Rq is determined as follows:

A TAYLOR HOBSON FTS (Form Talysurf Series 2) profilometer/roughness measuring system is advantageously used to determine the root-mean-square profile height Rq (2DRq) of the surface (also referred as roughness Rq before).

The system includes a laser head (product reference 112/2033-541, for example) and a 70 mm long feeler (product reference 112/1836) having a 2 mm radius spherical/conical head.

The system measures a two-dimensional profile in the chosen section plane to obtain a curve Z=f(x). In this example the profile is acquired over a distance of 20 mm.

Various surface characteristics can be extracted from this profile, in particular its shape, undulation and roughness.

Accordingly, to determine Rq, the profile is subject to two different processes, namely shape extraction and filtering, which corresponds to mean line extraction.

The various steps for determining a parameter Rq of this kind are as follows:

acquisition of the profile Z=f(x),
shape extraction,
filtering (mean line extraction), and
determination of parameter $R_q$.

The profile acquisition step consists in moving the stylus of the aforementioned system over the surface of the lens in question, to store the altitudes Z of the surface as a function of the displacement x.

In the shape extraction step, the profile obtained in the previous step is related to an ideal sphere, i.e. a sphere with minimum profile differences relative to that sphere. The mode chosen here is the LS arc mode (best circular arc extraction).

This provides a curve representative of the characteristics of the profile of the surface in terms of undulation and roughness.

The filtering step retains only defects corresponding to certain wavelengths. In this example, the aim is to exclude undulations, a form of defect with wavelengths higher than the wavelengths of defects due to roughness. Here the filter is of the Gaussian type and the cut-off used is 0.25 mm.

$R_q$ is determined from the curve obtained using the following equation:

$$R_q = \sqrt{\frac{1}{N}\sum_{n=1}^{N}(Zn)^2}$$

where Zn is, for each point, the algebraic difference Z relative to the mean line calculated during filtering.

The toric surface can be pre-treated before applying the process of the invention. The pre-treatment can be physical, for example a plasma or corona discharge treatment, or chemical, for example a solvent treatment or a NaOH treatment.

BRIEF DESCRIPTION OF THE DRAWINGS

The foregoing and other objects, features and advantages of the present invention will readily become apparent to those skilled in the art from a reading of the detailed description hereafter when considered in conjunction with the accompanying drawings, wherein

FIGS. 5A to 5C are a schematic view of a 5 drops pattern of curable composition outside the scope of the present invention (FIG. 5A) and photographs of the resulting coated toric surfaces of lenses obtained through a transfer coating process using the 5 drops pattern of FIG. 5A and a total of 0.12 g (FIG. 5B) and 0.15 g (FIG. 5C) of liquid curable composition;

FIGS. 7A to 7C are a schematic view of a 3 drops pattern of curable composition outside the scope of the present invention (FIG. 7A) and photographs of the resulting coated toric surfaces of lenses obtained through a transfer coating process using the 3 drops pattern of FIG. 7A and a total amount of 0.12 g (FIG. 7B) and 0.15 g (FIG. 7C) of liquid curable composition;

FIG. 10A is a schematic view of a single central drop pattern of liquid curable composition and FIGS. 10B and 10C are photographs of the resulting coated toric surfaces of lenses obtained through a transfer coating process using the drop pattern of FIG. 10A and a total amount of liquid curable composition of 0.12 g and 0.15 g, respectively.

DETAILED DESCRIPTION OF THE PREFERRED EMBODIMENT

Figure 1:
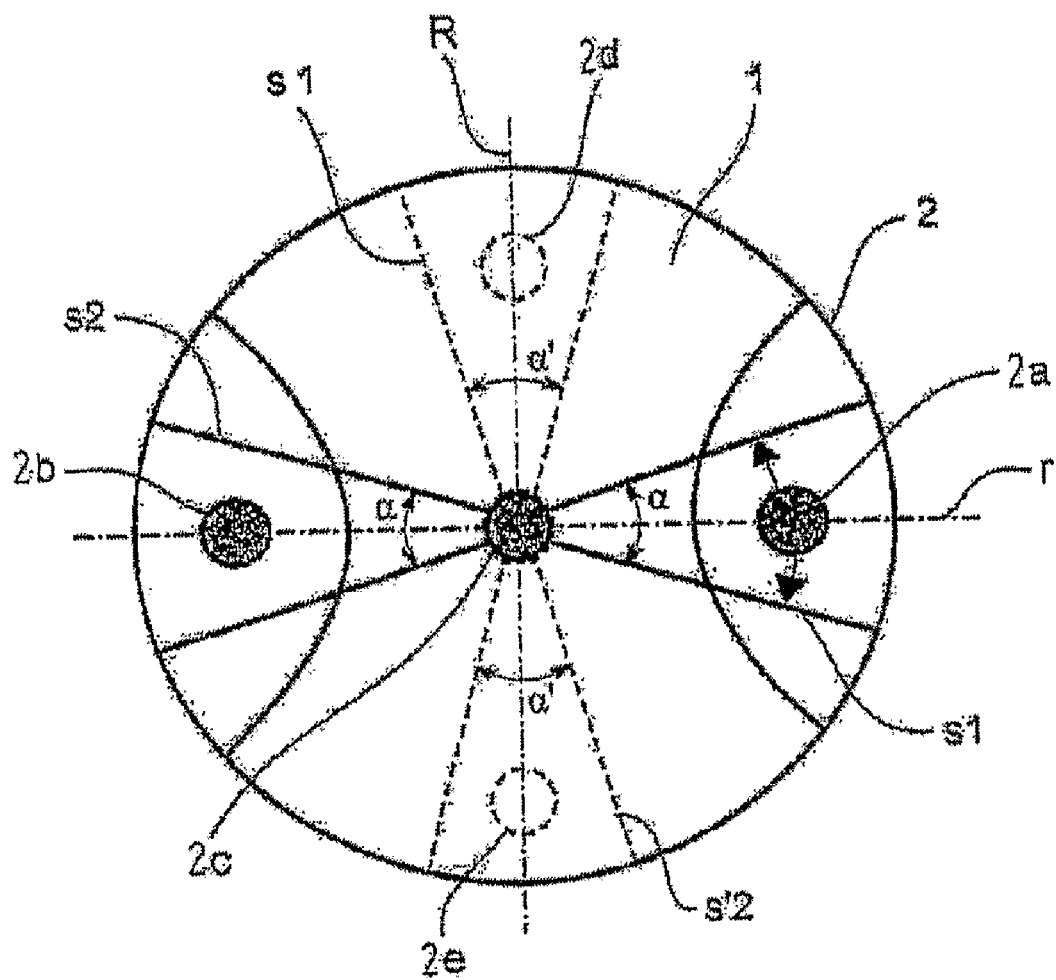
FIG. 1 is a schematic view of the preferred drop patterns for use in the process of the invention.

Referring now to the drawings and in particular to FIG. 1, there is schematically represented a lens 1 with a circular periphery 2. The lens has a toric surface having a first principal meridian of lower radius of curvature r and a second principal meridian of higher radius of curvature R.

In the coating forming process of the invention, at least two drops of a liquid curable composition 2a, 2b are deposited on the toric surface of the lens 1 within two opposite sectors S1, S2 centered on the first principal meridian r and having an apex angle α up to 40°, preferably up to 30°.

As shown in FIG. 1, additional drops may be provided and are represented by dot lines.

These additional drops are preferably deposited at the center of the toric surface (drop 2c) and/or in opposite sectors S'1, S'2 centered on the second principal meridian R and having an apex angle α' up to 40°, preferably up to 30° (drops 2d, 2e).

Preferably, the drops 2a, 2b, 2d, 2e are deposited on the meridians r and/or R, and at a distance from the periphery of the lens ranging from 4 to 20 mm, preferably 5 to 10 mm (distance of liquid drop edge to the periphery).

The above deposition patterns allow obtaining a coating covering the entire surface area of a toric surface of a lens both in a press coating process and a transfer coating process as disclosed below in connection with FIGS. 2A, 2B and 3A, 3B.

Although, the following description will be made in connection with UV curing of the liquid coating composition, similar apparatus and process can be used with a thermally curable coating composition.

Figure 2A:
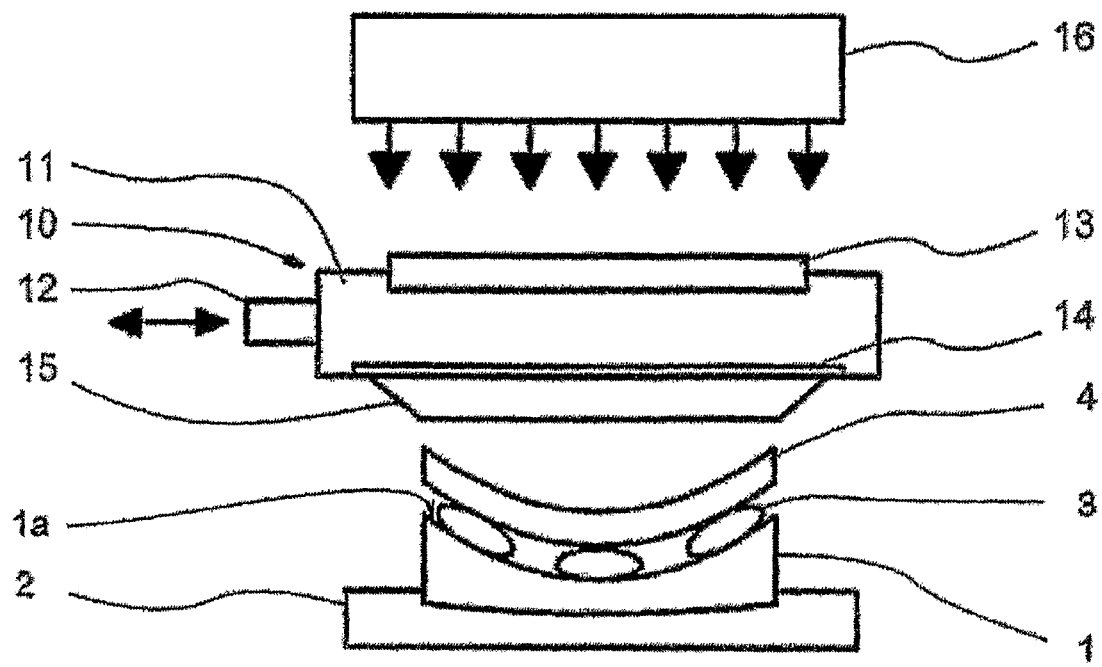
FIGS. 2A and 2B are schematic views of the main steps of an embodiment of a press coating process according to the invention.

Referring to FIG. 2A, a lens blank 1, for example a toric lens blank, is placed in a lens blank support 2 with its fine but unpolished geometrically defined toric face 1a facing outwardly.

2, 3, 4 or 5 drops of UV curable liquid coating composition 3 are deposited on the toric surface 1a (back side) of the lens blank 1, according to patterns disclosed in connection with FIG. 1.

A thin flexible wafer 4, for example a spheric wafer, is placed on the coating composition.

The whole assembly is then placed in front of the membrane 14 of an inflatable membrane apparatus 10.

The inflatable membrane apparatus 10 comprises a fluid accumulator 11, for example an air accumulator provided with fluid port 12, for example an air port connected to a pressurized fluid source (not represented) for introducing pressurized fluid within the accumulator and also evacuating pressurized fluid from the accumulator. The upper face of the accumulator 10 comprises a light transparent portion 13, for example a UV transparent quartz glass portion, whereas the lower face of the accumulator 10 comprises a transparent inflatable membrane 14 in register with the transparent quartz glass 13.

As shown in FIG. 2A, the apparatus 10 further comprises a guiding means 15 for laterally guiding the inflatable membrane 14 during inflation thereof. More specifically, this guiding means comprises a trunconical part or funnel 15 projecting outwardly from the lower face of the accumulator 10 and whose greater base is obturated by the inflatable membrane 14 and whose smaller base is a circular opening having a diameter at least equal to the base diameter of the flexible wafer 4 but preferably slightly larger (up to 5 mm larger).

Typically, the funnel height will range from 10 to 50 mm, preferably 10 to 25 mm, and will have a taper of 10 to 90°, preferably 30 to 50°.

Finally, a light source, for example a UV light source 16 is placed behind the accumulator 10 in front of the transparent quartz plate 13.

Generally, the assembly comprising the lens blank holder 2, the lens blank 1, the coating composition drops 3 and the flexible wafer 4 is placed so that the rim of the flexible wafer 4 be within the plan of the rim of the smaller base opening of funnel 15 or separated therefrom by a distance up to 50 mm, preferably up to 20 mm.

Figure 2B:
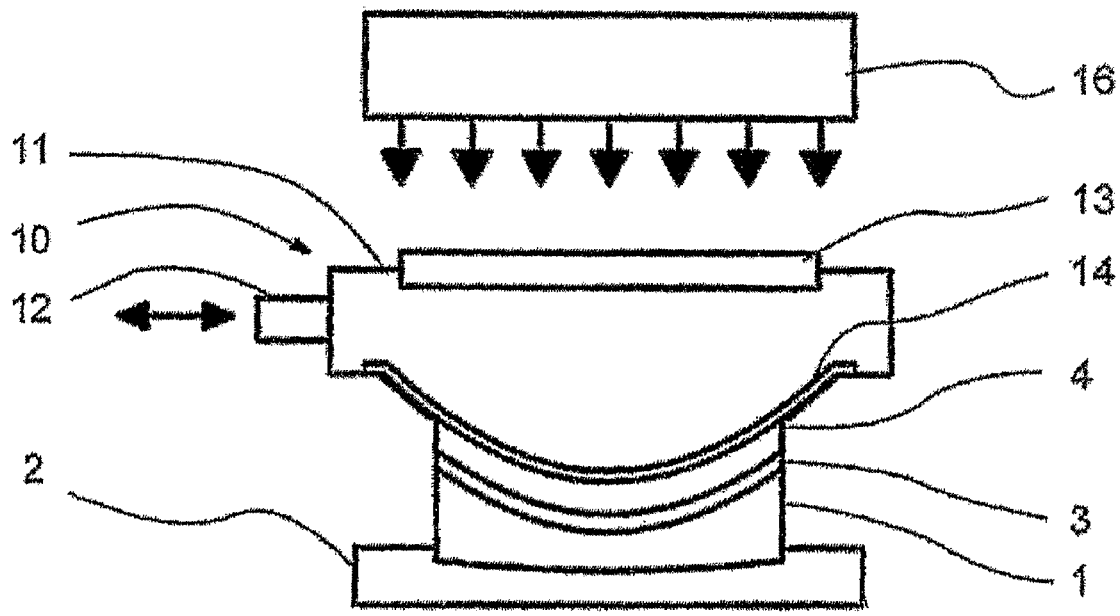

As shown in FIG. 2B, a pressurized fluid, such as pressurized air, is introduced into the accumulator 11 from an external source (not represented) through entrance 12. The pressure increase within the accumulator, inflates the inflatable membrane 14 and, thanks to the membrane guiding means 15, the membrane 14 uniformly urges the flexible wafer 4 against the lens blank 1, while uniformly spreading the coating composition 3.

The coating composition is then UV-cured.

After completion of the curing step, the lens blank 1 is disassembled from the holder 2 and the flexible wafer 4 is removed to recover a lens blank 1 whose toric surface 1a is provided with a coating.

Of course, in case of a thermal curing process, light source and transparent portion of the upper face of the accumulator are not needed.

In this case also, the inflatable membrane needs not to be transparent. Otherwise, the apparatus remains the same.

Figure 3A:
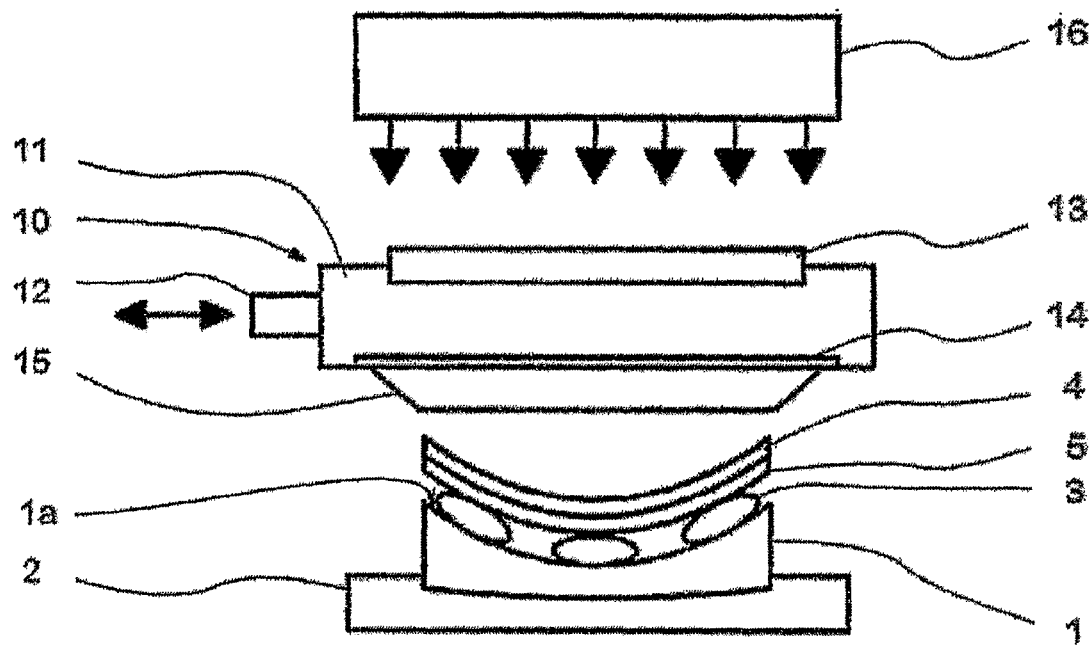
FIGS. 3A and 3B are schematic views of the main steps of an embodiment of a transfer coating process according to the invention
Figure 3B:
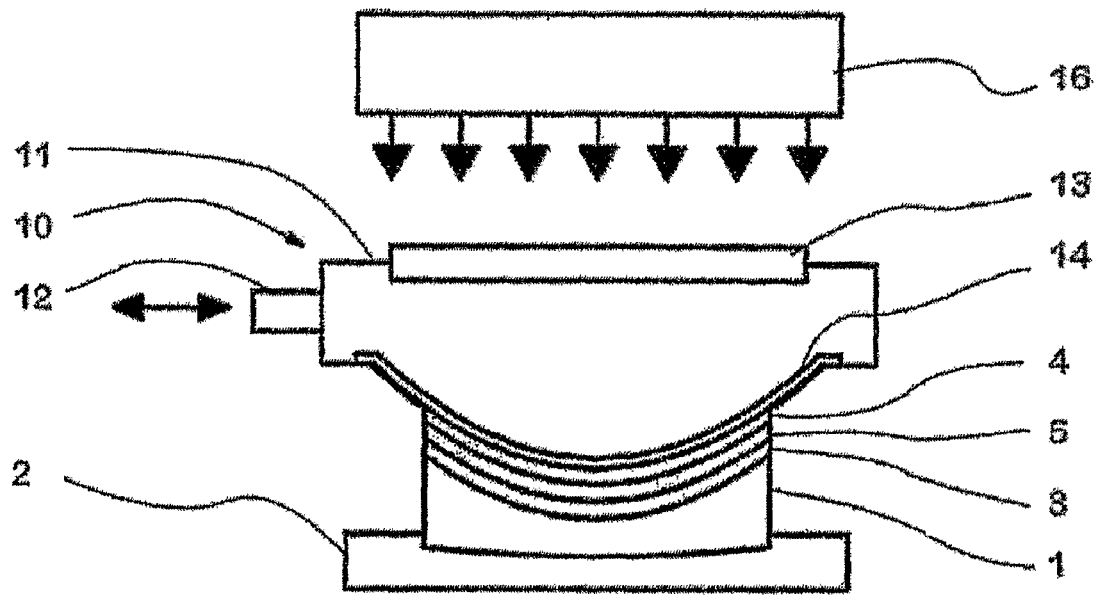

FIGS. 3A and 3B are schematic views of the process of the invention in which the transfer of a coating is performed using a flexible mold part or carrier which is urged against the lens blank surface using an inflatable membrane.

FIG. 3A shows the lens blank, flexible carrier and inflatable membrane before pressurization and inflation of the membrane, whereas FIG. 3B shows the same after pressurization and inflatation of the membrane.

Referring to FIG. 3A, a lens blank 1, having a toric surface 1a is placed in a lens blank holder 2 with its toric surface 1a facing outwardly.

Drops of liquid transparent adhesive 3 are deposited according to a disposition pattern disclosed above on the toric surface 1a of the lens blank 1.

A thin flexible carrier 4, for example a spheric carrier, having a transferable coating 5 deposited on one of its faces, is placed on the adhesive drops 3 so that the transferable coating 5 is in contact with the adhesive drops 3.

The whole assembly is placed in front of an inflatable membrane apparatus 10.

The inflatable membrane apparatus 10 as disclosed above, for example an air accumulator 11 provided with fluid port 12, for example an air port connected to a pressurized fluid source (not represented) for introducing pressurized fluid within the accumulator and also evacuating pressurized fluid from the accumulator. The upper face of the accumulator 10 comprises a light transparent portion 13, for example a UV transparent, quartz glass portion.

As shown in FIG. 3B, a pressurized fluid, such as pressurized air, is introduced into the accumulator 11 from an external source (not represented) through entrance 12. The pressure increase within the accumulator, inflates the inflatable membrane 14 and, thanks to the membrane guiding means 15, the membrane 14 uniformly urges the flexible carrier against the lens blank 1, while uniformly spreading the adhesive 3.

The adhesive is then UV-cured.

After completion of the curing step, the lens blank 1 is disassembled from the holder 2 and the flexible carrier 4 is removed to recover a lens blank 1 whose torical surface 1a bears the transferred coating 5 by adhesion through the adhesive coating layer 3.

EXAMPLES 1 TO 5 AND COMPARATIVE EXAMPLES C1 TO C7

In each example, the toric back surface of a 70 mm diameter lens made of polycarbonate (PC) is coated by depositing, spreading and curing a liquid UV curable adhesive coating composition A, using a convex flexible mold part (carrier).

UV curable adhesive composition A:
45 wt % of bis(4-methacryloylthioethyl)sulphide;
30 wt % of ethoxylated bisphenol-A dimethacrylate;
25 wt % of diethyleneglycol diacrylate;
3 phr of Irgacure 819 (3% photoinitiator for 100% of monomers).

a) Deposition of Protective and Release Coating on the Fexible Mold Part.

A protecting and releasing coating is applied on the front (convex) surface of the flexible mold part carrier (0.5 mm thick PC carriers).

Flexible mold part (carrier):
0.5 mm thick PC carriers 6.40 base curvature.

The composition of the protecting releasing coating (PRC coating) was as follows:

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PRC coating is deposited as follows:

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

The PRC coating will not be transferred during the BST process and will adhere on the flexible mold part. One of its main function is to help the release of the cured coating composition A from the flexible mold part.

b) Coating Process

The UV curable adhesive coating composition A is deposited on the toric back surface of the lens, using processes according to the invention (examples 1 to 5) and outside the scope of the invention (examples C1 to C7), which are similar to those disclosed in connection with FIGS. 3A-3B.

Detailed parameters of the process are given hereafter.

Process Parameters
membrane pressure (pressure applied by the membrane on the mold)
12 psi (0.827 bar)
UV irradiation
By a Xenon lamp RC 742 OEM system with UV intensity of about 1000 mW/cm$^2$ and 5 seconds UV dose at 220 mJ/cm$^2$.
Exposure time
25 seconds Then the lens having its back toric surface coated with cured composition A is separated from the flexible mold part.

In order to make an evaluation of the cured adhesive coated lens, the lens is dipped in an aqueous water bath of BPI black dye at 96° C. plus or minus 3° C. during 45 minutes.

The cured adhesive coating is tintable in those conditions, the PC lens substrate being not tintable.

The areas where no transfer occurred (i.e areas not covered by the cured coating) are not colored and are visualised by the naked eye.

The areas which are not colored are identified as area of "no transfer spot (NTS)", meaning that the coating A is not spread out in some areas of the surface of the lens.

Detailed parameters of the toric lenses, carrier, adhesive coating composition drop patterns and results of adhesive transfer (transfer or NTS) are given in table 1.

A lens is good if no NTS is seen.

TABLE 1

Figure 4B:
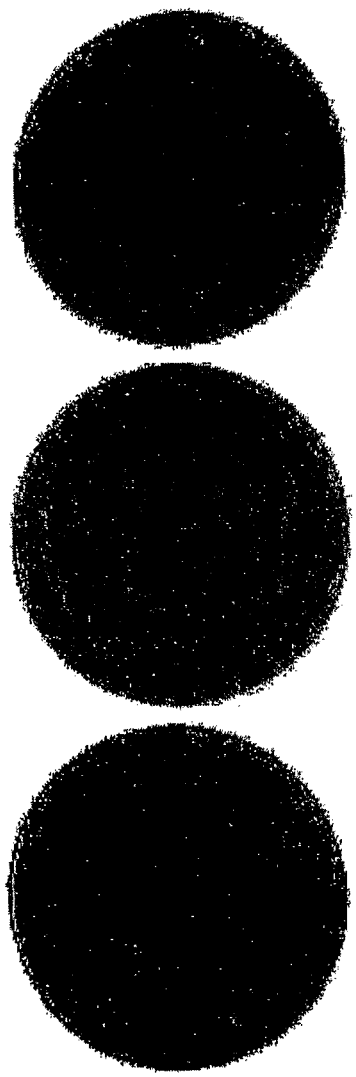
FIGS. 4A to 4C are a schematic view of a 5 drops pattern of curable composition according to the invention (FIG. 4A) and photographs of the resulting coated toric surfaces of lenses obtained through a transfer coating process using the 5 drops pattern and a total amount of 0.12 g (FIG. 4B) and 0.15 g (FIG. 4C) of liquid curable composition.
Figure 4C:
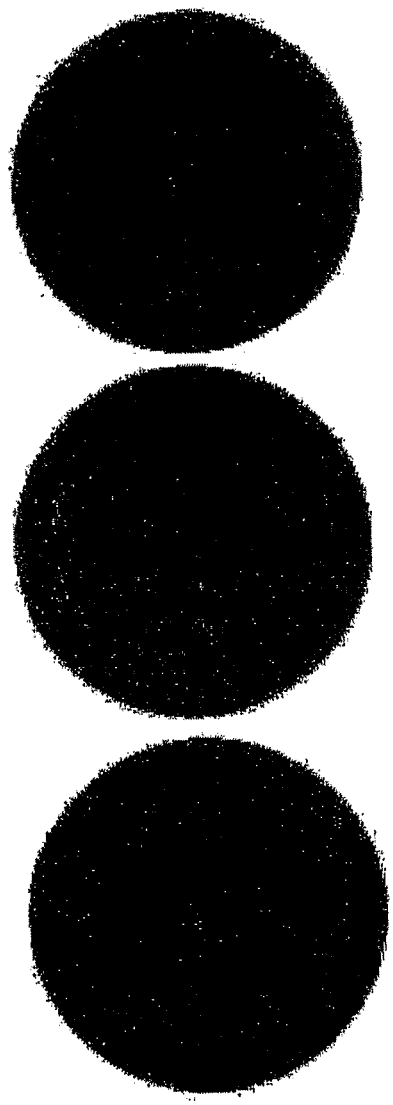
Figure 4A:
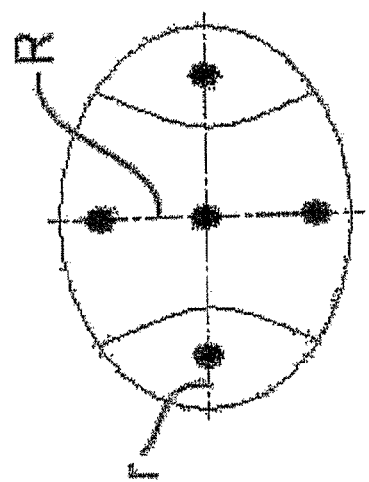
Figure 6C:
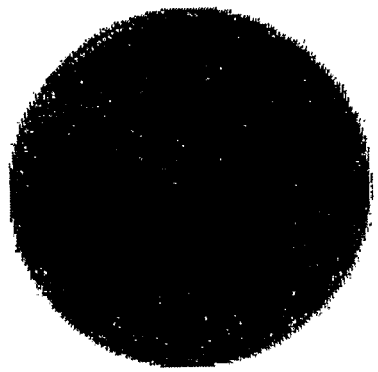
FIGS. 6A to 6C are a schematic view of a 3 drops pattern of curable composition according to the invention (FIG. 6A) and photographs of the resulting coated toric surfaces of lenses obtained through a transfer coating process using the 3 drops pattern and a total amount of 0.12 g (FIG. 6B) and 0.15 g (FIG. 6C) of liquid curable composition.
Figure 6C:
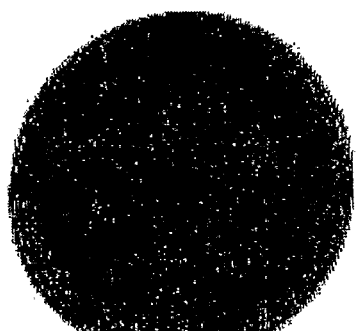
Figure 6C:
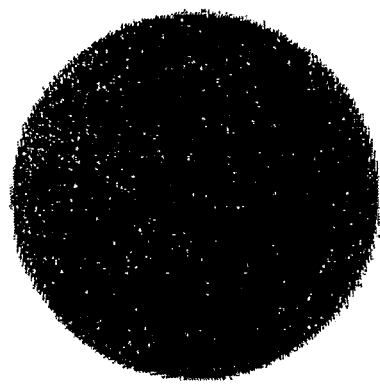
Figure 6C:
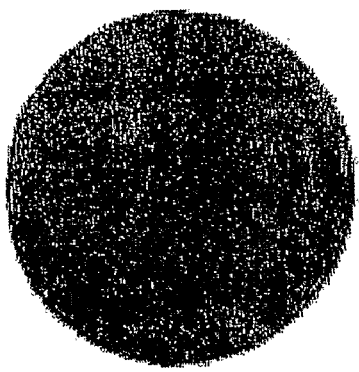
Figure 6C:
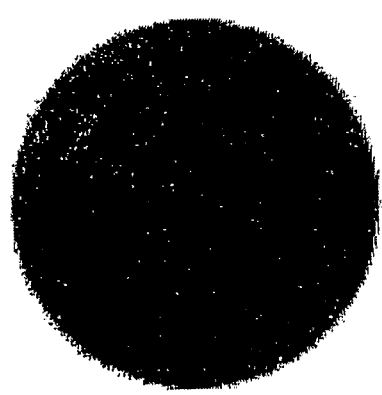
Figure 6B:
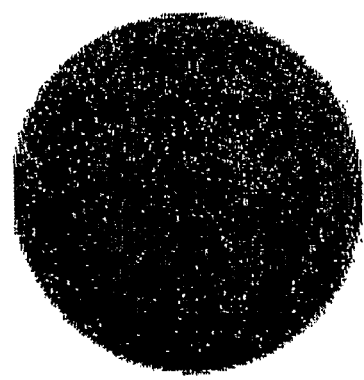
Figure 6A:
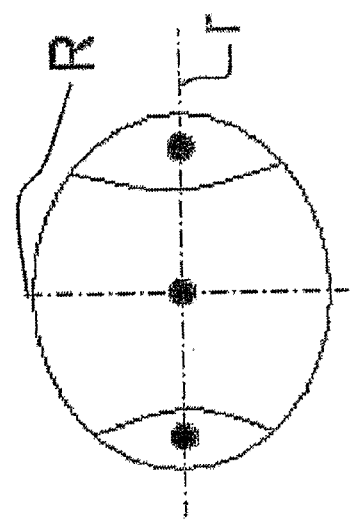
Figure 9B:
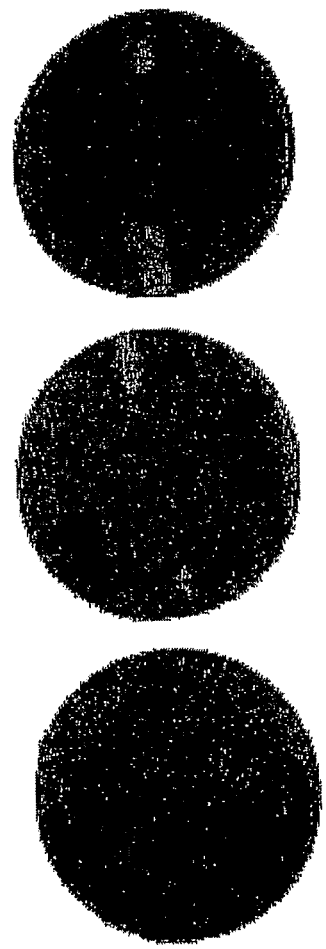
FIG. 9A is a schematic view of a 4 drops pattern of liquid curable composition outside the scope of the invention and FIG. 9B are photographs of the resulting coated toric surfaces of lenses obtained through a transfer coating process using the pattern of FIG. 9A and a total amount of liquid curable composition of 0.12 g.
Figure 9A:
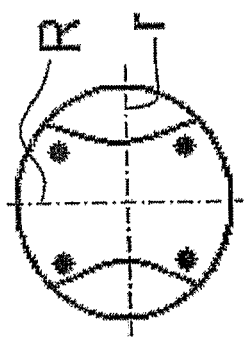
Figure 8B:
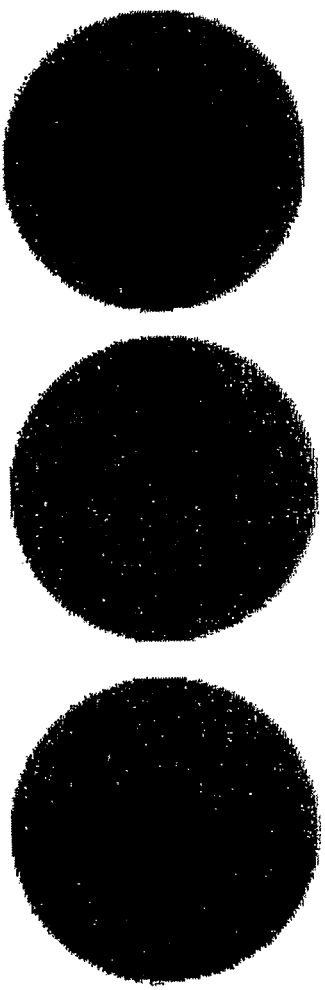
FIG. 8A is a schematic view of a 4 drops pattern of liquid curable composition according to the invention and FIG. 8B are photographs of the resulting coated toric surfaces of lenses obtained through a transfer coating process using the pattern of FIG. 8A and a total amount of liquid curable composition of 0.12 g
Figure 8A:
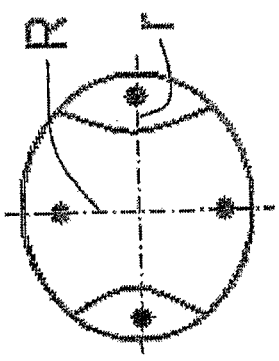

| Example n° | Toric lens Spherical power in dioptries | Toric back surface curvatures $BL_R/BL_r$ | Adhesive composition pattern | Adhesive composition total amount | Carrier base curvature BC | No-transfer spot (NTS) |
|---|---|---|---|---|---|---|
| 1 | −2.00/−2.00 | 5.00/6.80 | 5 drops pattern (FIG. 4A) | 0.12 g | 6.40 | Good |
| 2 | −2.00/−2.00 | 5.00/6.80 | 5 drops pattern (FIG. 4A) | 0.15 g | 6.40 | Good |
| C1 | −2.00/−2.00 | 5.00/6.80 | 5 drops pattern with 45° shift (FIG. 5A) | 0.12 g | 6.40 | Big NTS |
| C2 | −2.00/−2.00 | 5.00/6.80 | 5 drops pattern with 45° shift (FIG. 5A) | 0.15 g | 6.40 | Big NTS |
| 3 | −2.00/−2.00 | 5.00/6.80 | 3 drops pattern (FIG. 6A) | 0.12 g | 6.40 | Good |
| 4 | −2.00/−2.00 | 5.00/6.80 | 3 drops pattern (FIG. 6A) | 0.15 g | 6.40 | Good |
| C3 | −2.00/−2.00 | 5.00/6.80 | 3 drops pattern (FIG. 7A) | 0.12 g | 6.40 | Big NTS |
| C4 | −2.00/−2.00 | 5.00/6.80 | 3 drops pattern (FIG. 7A) | 0.15 g | 6.40 | Big NTS |
| 5 | −2.00/−2.00 | 5.00/6.80 | 4 drops pattern in edge to cover low & high side (FIG. 8A) | 0.12 g | 6.40 | Good |
| C5 | −2.00/−2.00 | 5.00/6.80 | 4 drops pattern with 45° shift (FIG. 5A) | 0.12 g | 6.40 | Big NTS |
| C6 | −2.00/−2.00 | 5.00/6.80 | 1 drop in center (FIG. 10A) | 0.12 g | 6.40 | Big NTS |
| C7 | −2.00/−2.00 | 5.00/6.80 | 1 drop in center (FIG. 10A) | 0.15 g | 6.40 | Big NTS |

The photographs of FIGS. 4 to 10 show that using drops patterns with only one central drop or with no drops on or near the first principal meridian of lower radius of curvature (higher base curvature) results in big "non-transfer spots" whereas with at least two drops at or near the first principal meridian a good transfer with no "no-transfer spots" is obtained.

EXAMPLES 6 AND 7

70 mm diameter progressive polycarbonate lenses (ESSILOR AIRWEAR®) with 2.5 power, prescription power +1.25 plus cylinder 0.75 with axes angles 95°, so the lenses back curvatures are $BL_R$=4.40 and $BL_r$=5.10 are coated with a stack of coating layers HMC and a liquid UV curable adhesive composition (UV curable adhesive composition A as defined above) using a 0.5 mm thick PC carrier (curve 5.40 base).

Parameters regarding flexible molds multilayers coating to be transferred (HMC), liquid curable adhesive composition and transfer process are given below:

a) multilayer coated flexible mold part (carrier)

0.5 mm thick PC carriers (5.40 base curve) are coated on their front surfaces with a multilayer coating.

In examples 6, 7 the multilayer coating comprises hydrophobic top coat/anti-reflective coating/hard coating/primer coating (HMC).

Step 1: Protecting and Releasing Coating

The composition of the protecting and releasing coating was as follows:

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

Step 2: Hydrophobic Top Coat and Anti-Reflective (AR) Coating

The PC carrier after deposition of the protecting coating is vacuum coated as follows:

A/Standard Vacuum AR Treatment: The Vacuum AR treatment is accomplished in a standard box coater using well known vacuum evaporation practices. The following is one procedure for obtaining the VAR on the mold:
1. The carrier having the protective coating already applied on the surface, is loaded into a standard box coater and the chamber is pumped to a high vacuum level.
2. Hydrophobic coating (Chemical=Shin Etsu KP801M) is deposited onto the surface of the carrier using a thermal evaporation technique, to a thickness in the range of 2-15 nm.
3. The dielectric multilayer AR coating, consisting of a stack of sublayers of high and low refractive index materials is then deposited, in reverse of the normal order. Details of this deposition are as such:

The optical thicknesses of the alternating low and high refractive index layers are presented in the table (They are deposited in the indicated order, from the mold surface):

| | |
|---|---|
| Low index ($SiO_2$) | 103-162 nm |
| High index ($ZrO_2$) | 124-190 nm |
| Low index ($SiO_2$) | 19-37 nm |
| High index ($ZrO_2$) | 37-74 nm |

A preferred stack is a stack wherein the low index material is $SiO_2$ and the high index material is $ZrO_2$.

At the completion of the deposition of the four-layer anti-reflection stack, a thin layer of $SiO_2$, comprising of a physical thickness of 1-50 nm, is deposited. This layer is to promote adhesion between the oxide anti-reflection stack and a lacquer hard-coating which will be deposited on the coated mold at a later time.

Step 3: Hard Coat (HC) & Latex Primer Coating

The composition of the hard coating is as follows:

| Component | Parts by weight |
|---|---|
| Glymo | 21.42 |
| 0.1N HCl | 4.89 |
| Colloidal silica | 30.50 |
| Methanol | 29.90 |
| Diacetone alcohol | 3.24 |
| Aluminium acetylacetonate | 0.45 |
| Coupling agent | 9.00 |
| Surfactant FC-430 (3M company) | 0.60 |

The composition of the primer is as follows:

| Component | Parts by weight |
|---|---|
| Polyurethane latex W-234 | 35.0 |
| Deionized water | 50.0 |
| 2-Butoxy ethanol | 15.0 |
| Coupling agent | 5.00 |

The PC carrier after deposition of protecting coating and AR coating in Steps 1 and 2 is then spin coated by HC solution at 600 rpm/1200 rpm, and precured 10 minutes at 80° C., and again spin coated by latex primer solution at the same speed and postcured for 1 hour at 80° C.

The coupling agent is a precondensed solution of:

| Component | Parts by weight |
|---|---|
| GLYMO (Glycidoxypropyltrimethoxysilane) | 10 |
| Acryloxypropyltriméthoxysilane | 10 |
| 0.1 N HCl | 0.5 |
| Aluminum acetylacetonate | 0.5 |
| Diacetone alcohol | 1.0 | b) Transfer parameters photocurable adhesive composition:

Photocurable composition A as previously defined.

membrane pressure (pressure applied by the membrane on the mold)

12 psi (0.827 bar).

UV irradiation

By a Xenon lamp/RC 7420 OEM system with UV intensity of about 1000 mW/cm$^2$ and 5 seconds UV dose at 220 mJ/cm$^2$.

Exposure time:

25 seconds.

Once the AR coated lens has been obtained, one visually inspect with the naked eye the surface of the AR coated lens on the back side.

Especially, one inspect the back side of the, lens in order to see if the reflected color is the same on all areas of that surface.

If there are areas of higher white color (due to light reflexion), it means that no AR was transferred and this area is identified as a NTS (No Transfer Spot).

Results of transfer are given in table 2.

TABLE 2

| Example n° | Number of lenses coated | Total amount of adhesive composition | Adhesive drop pattern | No-transfer spot |
|---|---|---|---|---|
| 6 | 5 | 0.15 g | 5 drops (FIG. 4A) | None |
| 7 | 5 | 0.12 g | 5 drops (FIG. 4A) | None |

EXAMPLES 8-12

Figure 11:
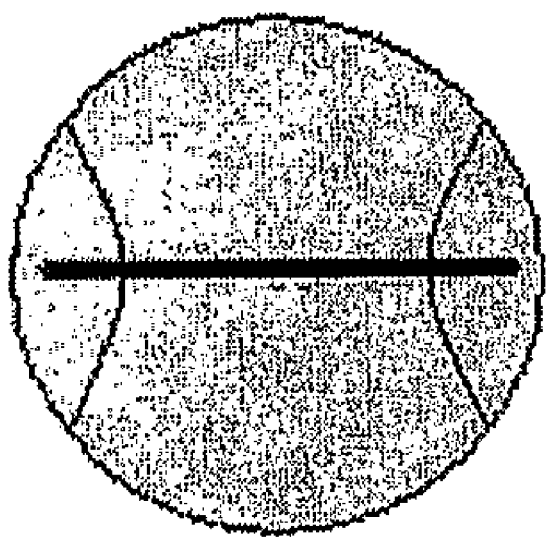
FIG. 11 is a schematic view of a thin line deposition pattern of the liquid curable composition.

Lenses were all Essilor lenses PC Varilux Comfort™, 5.50 front curve with 1.25 adding power surfaced to +0.50 sphere and −2.00 cylinder, with −5.10/−6.90 back curve and 71 mm diameter. HMC carriers were 68 mm diameter with 6.40 front curves. Adhesive composition was same as in Examples 1-7. The adhesive was dispensed in one line stream pattern, as shown in the FIG. 11, along the first principal meridian of lower curvature from one high toric side to another high toric side by dispenser from EFDTM. Accumulator pressure in the inflatable membrane apparatus was set for 12 psi (0.827 bar). UV irradiation was the same as in examples 1-7, except the exposure time was 40 seconds. The No-transfer spot results are shown in table 3.

TABLE 3

| Example no | Front base Curve | Comfort Add Power | Lens Power | Cylinder | Back base Curve | HMC Carrier base Curve | Adhesive dispense pattern | Adhesive total amount | No transfer spot (NTS) |
|---|---|---|---|---|---|---|---|---|---|
| 8 | 5.50 | 1.25 R | 0.50 | −2.00 | −5.10/−6.90 | 6.40 | 1 Line Stream | 0.20 g | Good |
| 9 | 5.50 | 1.25 R | 0.50 | −2.00 | −5.10/−6.90 | 6.40 | 1 Line Stream | 0.20 g | Good |
| 10 | 5.50 | 1.25 R | 0.50 | −2.00 | −5.10/−6.90 | 6.40 | 1 Line Stream | 0.20 g | Good |
| 11 | 5.50 | 1.25 R | 0.50 | −2.00 | −5.10/−6.90 | 6.40 | 1 Line Stream | 0.20 g | Good |
| 12 | 5.50 | 1.25 R | 0.50 | −2.00 | −5.10/−6.90 | 6.40 | 1 Line Stream | 0.20 g | Good |

The invention claimed is:

1. A process for forming at least one coating layer on a toric surface of an optical article which comprises:

providing an optical article having a toric surface comprising a first principal meridian with a lower radius of curvature r and a second principal meridian with a higher radius of curvature R (r>R) and a periphery;

depositing on said toric surface of the optical article a pre-measured amount of a liquid curable composition;

applying pressure on said pre-measured amount of liquid curable composition to cause said liquid curable composition to spread over the toric surface of the optical article;

curing the liquid curable composition; and recovering an optical article coated with at least one coating layer;

wherein, the liquid curable composition deposition step comprises depositing on the toric surface at least two drops of the liquid curable composition, each within one of two opposite sectors centered on the first principal meridian of lower radius of curvature r and having an apex angle up to 40°.

2. The process of claim 1, wherein the opposite sectors have an apex angle up to 30°.

3. The process of claim 1, wherein said at least two drops are deposited on the first principal meridian.

4. The process of claim 1, wherein said at least two drops are deposited at a distance from the periphery of the optical article ranging from 2 to 20 mm.

5. The process of claim 4, wherein said at least two drops are deposited at a distance from the periphery of the optical article ranging from 5 to 10 mm.

6. The process of claim 1, wherein the liquid curable composition deposition step comprises depositing an additional drop of the liquid curable composition at the center of the toric surface or dispensing the drops in one line stream.

7. The process of claim 1, wherein the liquid curable composition deposition step comprises depositing two additional drops of the liquid curable composition each within one of two opposite sectors centered on the second principal meridian of higher radius of curvature R and having an apex angle of up to 40°.

8. The process of claim 7, wherein the two opposite sectors have an apex angle up to 30°.

9. The process of claim 7, wherein the two additional drops are deposited on the second principal meridian.

10. The process of claim 7, wherein the two additional drops are deposited at a distance from the periphery of the optical article ranging from 2 to 20 mm.

11. The process of claim 7, wherein the two additional drops are deposited at a distance from the periphery of the optical article ranging from 5 to 10 mm.

12. The process of claim 1, wherein the pre-measured amount of liquid curable composition is 0.25 g or less.

13. The process of claim 12, wherein the pre-measured amount of liquid curable composition is 0.20 g or less.

14. The process of claim 1, wherein the pressure application step comprises:

providing a mold part having an internal and an external surface;

moving relatively to each other the optical article and the mold part to bring the internal face of the mold part into contact with the liquid curable composition; and applying pressure on the external face of the mold part.

15. The process of claim 14, wherein the mold part is a flexible wafer.

16. The process of claim 14, wherein the internal face of the mold part bears one or more additional coating layers, whereby said one or more additional coating layers are transferred on the toric surface of the optical article at the completion of the process.

17. The process of claim 16, wherein the coating layer or layers comprise a hydrophobic top coat, an anti-reflective coating, an anti-abrasion coating, an impact resistant coating, a polarized coating, a photochromic coating, a dying coating or a stack of two or more of these coatings.

18. The process of claim 14, further comprising placing a transparent film between the internal face of the mold part and the toric surface of the optical article having the pre-measured amount of liquid curable composition deposited thereon, whereby, after completion of the process, the film is glued on the toric surface of the optical article.

19. The process of claim 18, wherein an external face of the transparent film is coated with at least one coating layer.

20. The process of claim 19, wherein said at least one coating layer comprises a hydrophobic top coat, an anti-reflective coating, an anti-abrasion coating, an impact resistant coating, a polarized coating, a photochromic coating, a dying coating or a stack of two or more of these coatings.

21. The process of claim 18, wherein the mold part is an inflatable membrane.

22. The process of claim 1, wherein said at least one coating layer, after curing, has a thickness of 100 μm or less.

* * * * *

UNITED STATES PATENT AND TRADEMARK OFFICE
CERTIFICATE OF CORRECTION

PATENT NO. : 7,632,432 B2
APPLICATION NO. : 11/570012
DATED : December 15, 2009
INVENTOR(S) : Adileh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 192 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,632,432 B2  Page 1 of 1
APPLICATION NO. : 11/570012
DATED : December 15, 2009
INVENTOR(S) : Fadi Adileh et al.

It is certified that error appears in the above-identified patent and that said Letters Patent is hereby corrected as shown below:

In claim 1, column 17, line 24, delete "r > R" and insert --r < R-- therefor.

Signed and Sealed this
Eleventh Day of January, 2011

David J. Kappos
*Director of the United States Patent and Trademark Office*